INVENTOR
J. Lyle Claiborne
BY Stevens, Davis, Miller & Mosher
ATTORNEYS

Dec. 12, 1967  J. L. CLAIBORNE  3,358,161
BATCH TEMPERATURE-FUNCTION PROGRAM CONTROLLER
Filed June 8, 1964  6 Sheets-Sheet 2
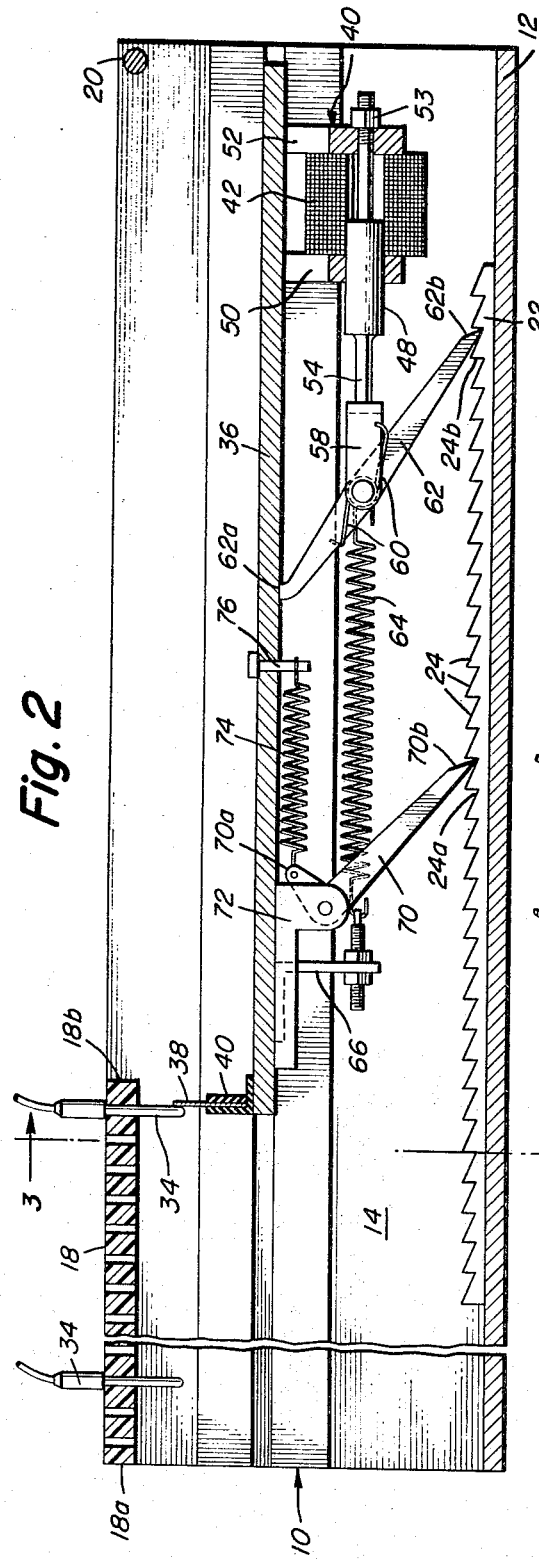
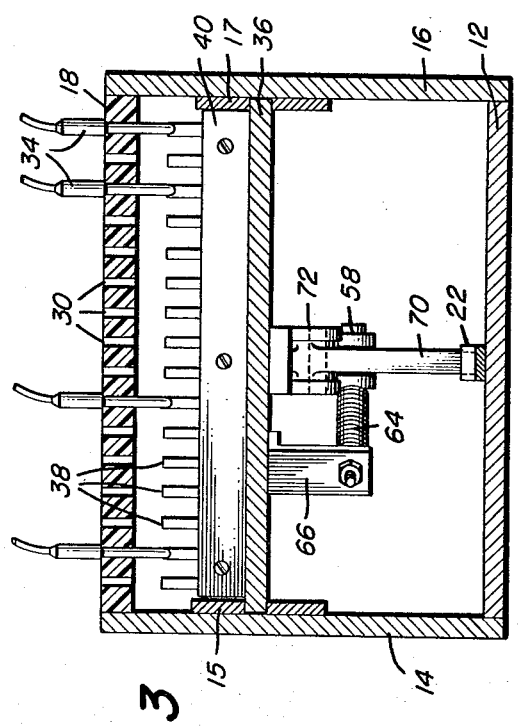
INVENTOR
J. Lyle Claiborne
BY
Stevens, Davis, Miller & Mosher
ATTORNEYS

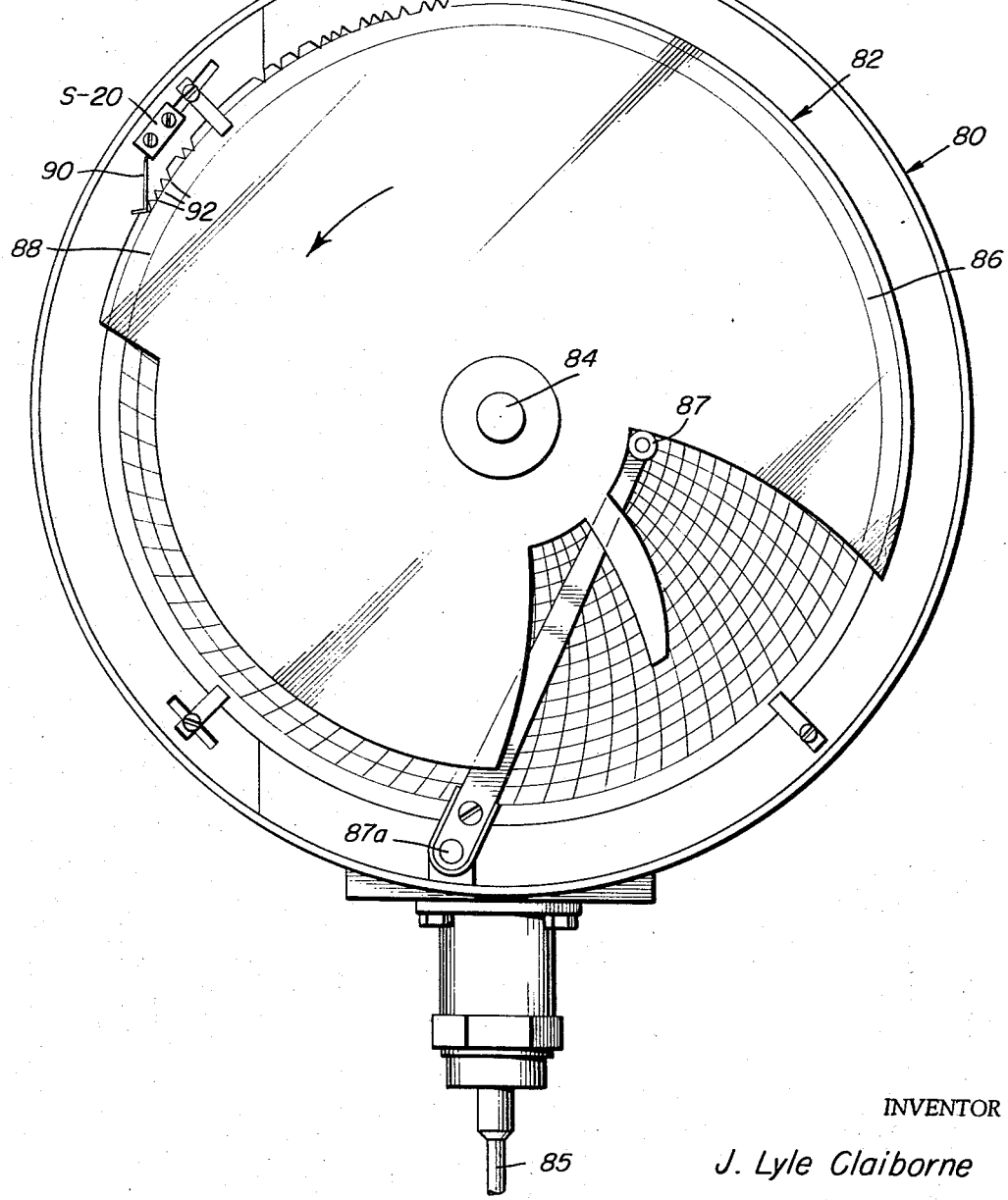

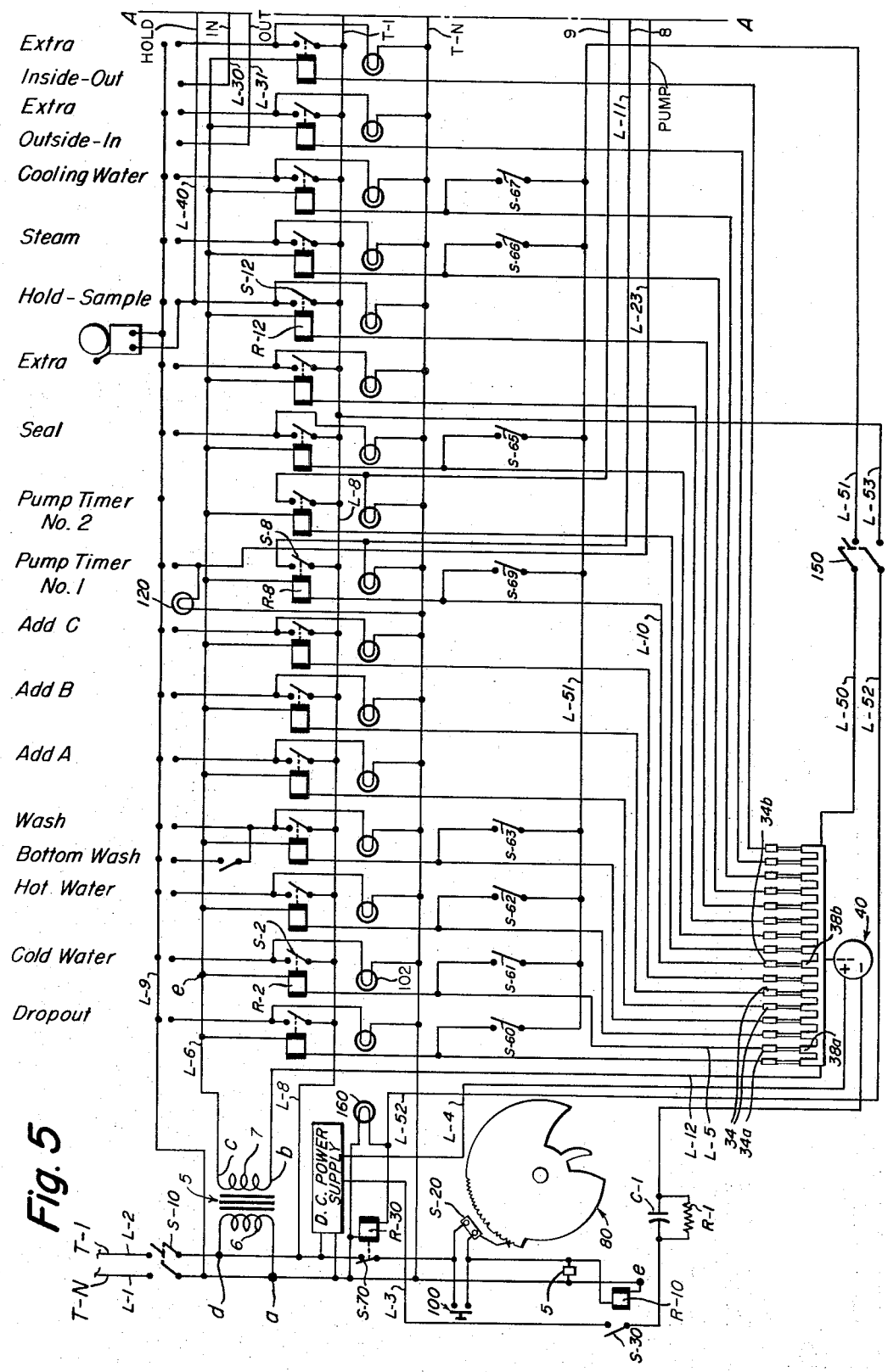

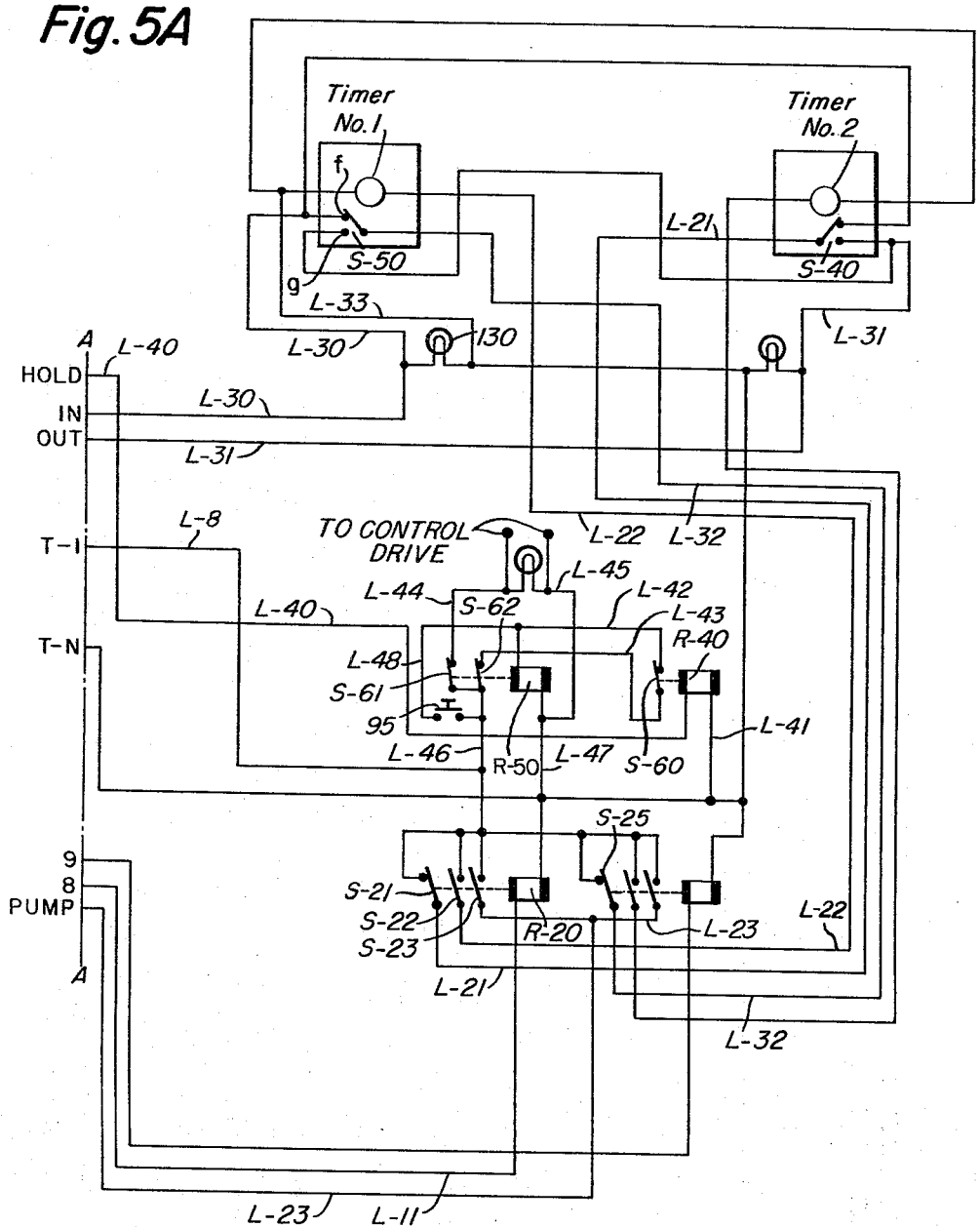

Dec. 12, 1967     J. L. CLAIBORNE     3,358,161

BATCH TEMPERATURE-FUNCTION PROGRAM CONTROLLER

Filed June 8, 1964     6 Sheets-Sheet 6

INVENTOR
J. Lyle Claiborne

BY
Stevens, Davis, Miller & Mosher
ATTORNEYS

United States Patent Office 3,358,161
Patented Dec. 12, 1967

3,358,161
BATCH TEMPERATURE-FUNCTION PROGRAM CONTROLLER
Jefferson L. Claiborne, Chattanooga, Tenn., assignor to Dixie Yarns, Inc., a corporation of Tennessee
Filed June 8, 1964, Ser. No. 373,457
4 Claims. (Cl. 307—140)

ABSTRACT OF THE DISCLOSURE

A batch temperature-function program controller in which a cam having a contoured periphery moves through a path to move two followers, each of which engages the cam 180° apart. A function control mechanism and a batch temperature control device are provided along with means responsive to displacement of the followers to actuate these controls.

---

This invention relates to control apparatus and more particularly to apparatus for controlling a sequence of events while at the same time independently maintaining a separate parameter such as the control of temperature during a textile dyeing operation.

In the package dyeing of textiles various operations are required to be performed in predetermined sequence and at intervals which are often fairly long. In addition temperature is critical to many of these dyeing processes and therefore must be controlled as the various chemicals are added, agitated and circulated. Such operations extend over considerable periods of time and require close attention of an operator who is nevertheless not busy during most of the period that he is on duty. Such an operation is therefore expensive due to the uneconomic use of the operator time. On the other hand, the quality, uniformity and reproducibility of results depends on close and precise operator attention which renders the assignment of other duties not feasible.

It is an object of the present invention to provide apparatus for automatically controlling a sequence of events such as is involved in dyeing and at the same time to maintain another parameter such as temperature so that an operator's attention is not required from the beginning to the end of the process with resulting economy in labor and improvement in uniformity of results.

While this invention is described in the present specification with respect to a specific example involving the dyeing of textiles, the control apparatus is applicable to controlling all sorts and kinds of processes where events are required to take place at varying intervals of time. A further advantage of the present invention is that it is flexible in the sense that a large number of events may be made to take place simultaneously or to begin simultaneously and to terminate at different time intervals after the beginning. It is a further object of this invention to provide automatic means to shut off a control system of this nature automatically at a predetermined time in order that samples of the product and check of machinery may be made.

It is still a further object of this invention to provide means to manually control an apparatus of this nature in case of breakdown, power failure, etc.

Further objects and advantages of the present invention will be apparent from the following description, reference being had to the accompanying drawings wherein preferred embodiments of the present invention are clearly shown:

FIG. 2 is a vertical longitudinal sectional view of the automatic apparatus 2 in enlarged scale.

FIG. 3 is a view in transverse vertical section taken along the line 3—3 of FIG. 2.

FIG. 4 is a front view to an enlarged scale of the automatic control means shown also in FIGURE 1.

FIG. 5 and FIG. 5a are circuit diagrams illustrating the present invention in its application to automatic dyeing of yarn.

Before referring in detail to the drawings, the general operation of the device of the present invention will be described. A group of movable switch elements is advanced through a pattern of quick detachable switch elements, which are prearranged in a plurality of rows across the width of a stationary board. Contact between a movable switch element and a fixed switch element results in a circuit being actuated to perform any desired function of a particular process. The movable switch elements advance from row to row of fixed switch elements as a function of time, and may contact one or more of the fixed switch elements in each individual row according to how many functions are to be performed at that particular time sequence. The movable switch elements are advanced sequentially from row to row by means of a control device which simultaneously controls a parameter such as temperature. Thus, it is apparent that the movable switch elements can be pre-set according to the function or functions that are desired to be performed in a particular sequence, and the control device can be adapted to cause these functions to occur at predetermined intervals of time.

Figure 1:
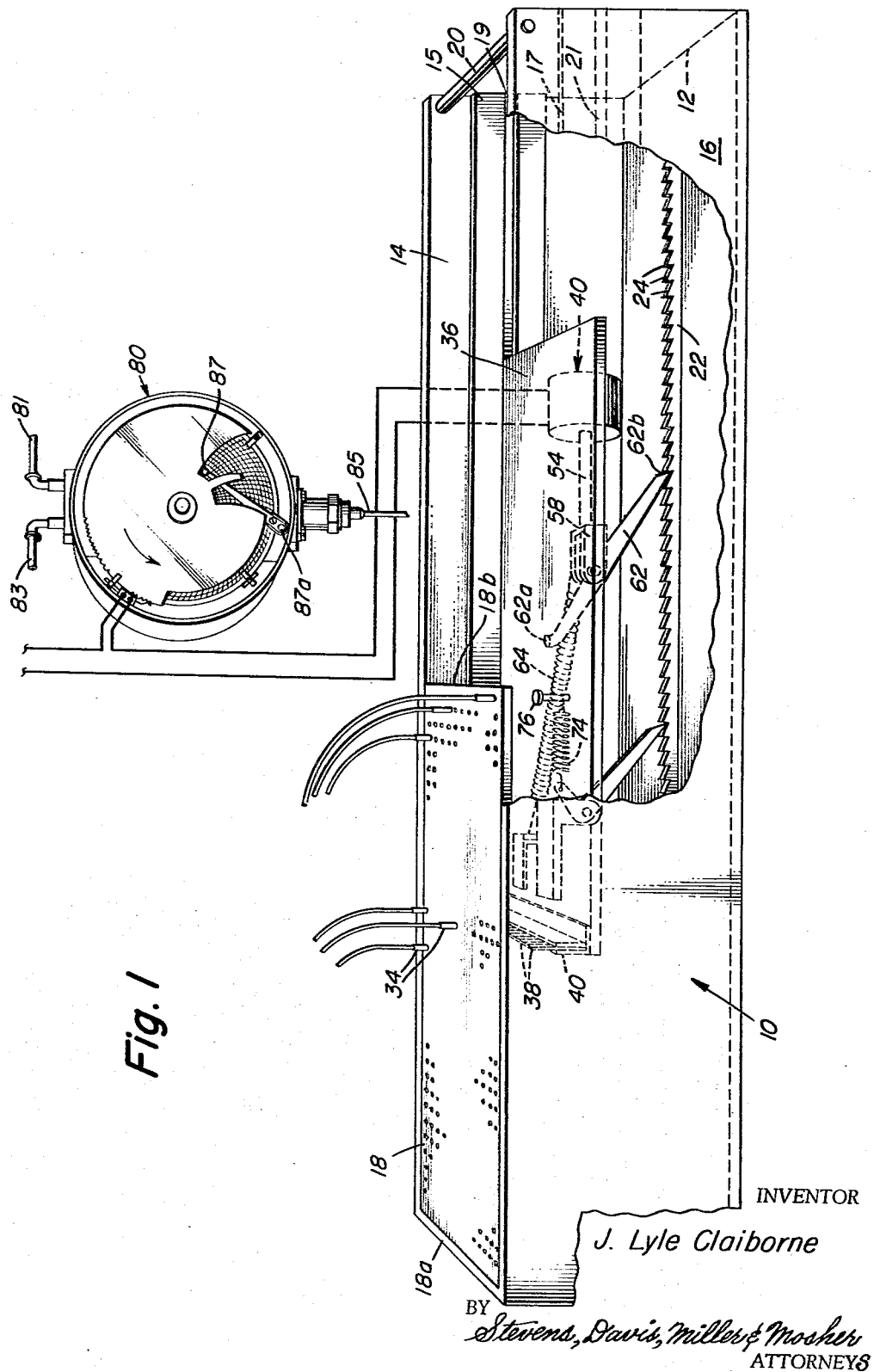
FIGURE 1 is a fragmentary isometric view of a switchboard forming a part of the present invention, apparatus for actuating the same automatically and control means therefor.

Referring now in greater detail to FIG. 1 the numeral 10 represents the switchboard means which, in general, consists of base 12, side pieces 14 and 16 each extending vertically upward from said base, top piece 18 flush at one end 18a of the switchboard 10, parallel with and extending approximately one-half the length of said base 12 and terminating at 18b, and a horizontal rod 20 connecting the two side pieces at the other end of the housing means. The base 12 has mounted on its upper surface and extending throughout substantially its entire horizontal length, a narrow, rack like, ratchet piece 22 which is notched at its upper surface, the notches being shown generally at 24. The parts thus far described remain stationary when the switchboard is in use. The two side pieces 14 and 16 each have a pair of narrow pieces 15 and 17, respectively (see FIG. 3), fastened to its inner surface and extending horizontally through its entire length, said pairs 15 and 17 each defining guiding grooves 19 and 21 that extend through the horizontal length of said side pieces.

Figure 6:
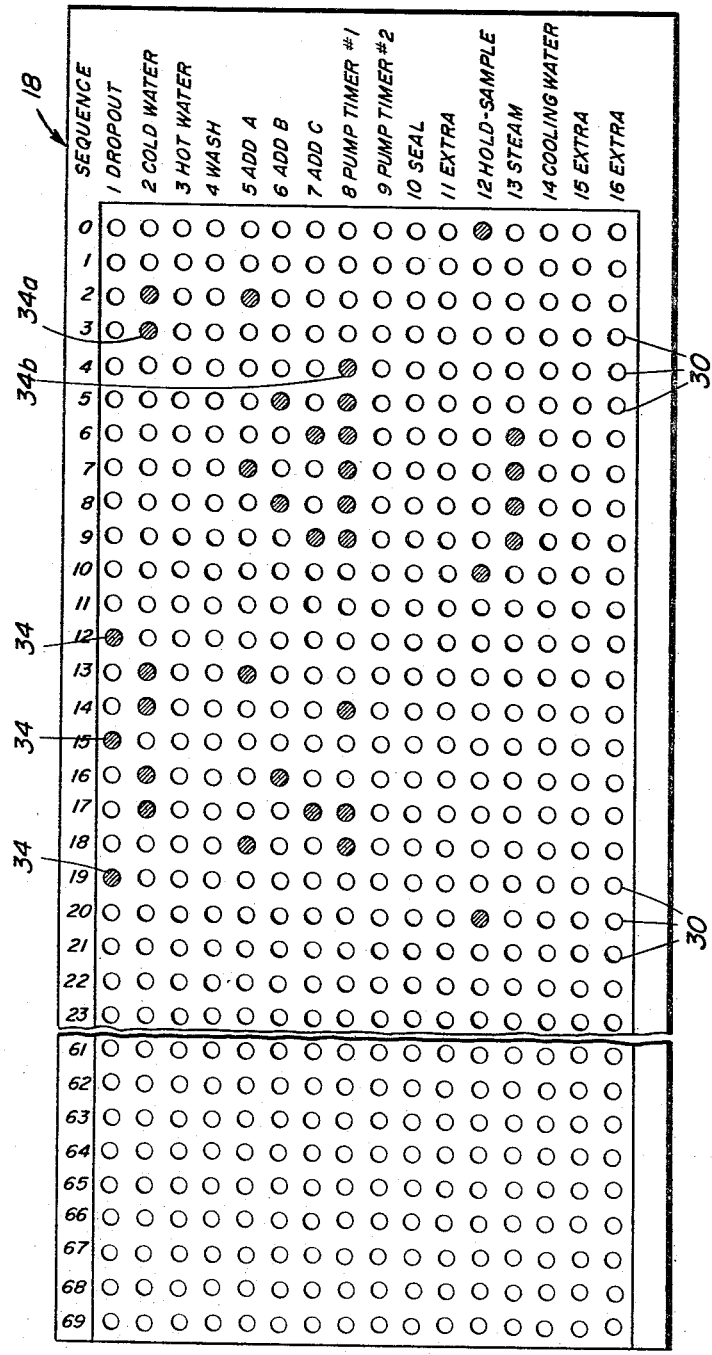
FIG. 6 is a top plan view of the setting of the switchboard of FIGURE 1 which corresponds to the selected illustrative automatic dyeing operation.

The stationary top piece 18, better shown in FIG. 6, is provided with a plurality of switch receptacles in the form of holes 30 drilled vertically through said top piece 18 and arranged in a series of horizontal rows numbered 1 to 69 that extend across the length of said top piece. Each hole is adaped to receive a quick detachable switch element shown generally at 34. By way of example only, various functions related to yarn dyeing are represented on the board.

Referring now to FIGS. 2 and 3, the numeral 36 generally represents the movable platen that rides in the grooves 19 and 21 and carries a group of switch elements 38 arranged in a horizontal row across the width of said platen and clamped thereto by clamping means 40.

The switch elements 38 mounted on movable platen 36 are advanced toward the stationary switch elements 34 mounted in top piece 18 by means shown better in FIGS. 2 and 3, said means comprising a solenoid shown generally at 40 and having a core 42. Integrally connected with arm 54 and extending in the space formed by core 42 is a plunger 48. Vertical pieces 50 and 52 are connected to the under surface of platen 36, extend vertically downward therefrom and are connected to the ends of core 42, and are also adapted to slide on plunger 48 and arm 54, respectively. Arm 54 is pivotally connected at one end to pawl 62 through clevis 58 and coil spring 60, and is fastened at the outer end of piece 52 by nut 53. Pawl 62 has top end 62a resting against the under surface of platen 36, bottom end 62b resting in a notch 24 of piece 22, and is connected to one end of a helical spring 64 which urges said pawl in a direction away from solenoid 40. Spring 64 is connected at its other end to a vertical piece 66 which is in turn connected to the under surface of platen 36 and extends downwardly therefrom. A second pawl 70 is pivotally connected to piece 72 which is also connected to the under surface of platen 36. Pawl 70 is L-shaped and is connected at one end 70a to spring 74, its other end 70b resting in a notch 24 of piece 22. Spring 74 urges pawl 70b into a notch 24 and is fastened to a bolt 76 which extends from the upper surface of the platen downwardly through a vertical hole therein.

The platen 36 carrying switch elements 38 is advanced toward stationary switch elements 34 mounted in top piece 18 in the following manner: (For purposes of illustration it is assumed that the device is in a position shown in FIG. 2 with nut 53 resting against vertical piece 52.) A signal is supplied to the solenoid 40 by control device 80 which sets up a magnetic flux in core 42 causing it to move to the left as viewed in FIG. 2 which in turn moves vertical pieces 50 and 52 and therefore platen 36 in the same direction, plunger 48 remaining stationary. This movement continues until vertical piece 52 contacts plunger 48 and the signal is stopped. Platen 36 has now advanced to the next row of plug receptacles on top piece 18a, and pawl 70 has advanced one notch to notch 24a on notch piece 22. This movement applies tension to spring 64 connected to pawl 62 and when the signal is stopped, plunger 48, due to the urging of spring 64, moves to the left until nut 53 contacts vertical piece 52. This advances pawl 62 one notch to notch 24b on notched piece 22. Upon succeeding signals to solenoid 40 the platen is advanced in this manner, the pawls advancing to the next notch and the switch elements 38 advancing to the next row of plug receptacles and making contact with any plugs 34 that might be placed in said receptacles.

The signal is supplied to solenoid 40 by a modified temperature control device 80 shown better in FIG. 4. While the temperature control functions per se form no part of the invention but rather are contained in apparatus belonging to the Partlow Corporation and described in their Bulletin No. 216 as revised in January, 1963, the function of that equipment will be briefly described.

Referring to the temperature control device 80 in general, air from any source enters the device through line 81 and a metered amount of it leaves through line 83 to an air-operated steam valve (not shown), the position of which is controlled by the amount of air it receives, A change in temperature at the point being controlled is sensed by the control which modulates the air pressure to the air-operated valve. Depending upon the degree to which the temperature has changed, the valve will restrict or increase the supply of the heating medium proportionally. A wide or narrow throttling range, within the limits of 10 to 25% of scale range can be selected by setting a range selector knob inside the case. The control is designed to produce an output air pressure of 3 to 15 pounds per square inch. Approximately 16 p.s.i. input pressure is required to obtain this range. The sensing is done by a follower 87 pivotally mounted at 87a and riding against the contoured periphery of cam 82, which may be set to make one complete rotation in a set period of time, for example, twenty-four hours. In addition to its control features, this device is a temperature recording instrument and will record on a chart located directly beneath the transparent cam any and all variations in temperature. The temperature is obtained by a capillary, not shown, which is connected to the device by line 85.

In most automative operations, it is necessary to control a parameter such as temperature simultaneously with the control of other functions of the operation. It has been found that the Partlow device can be modified to achieve this. To this end 180° (designated as side 86) of the cam 82 performs the above-described function of controlling temperature, while the other 180° of the cam (designated as side 88) is, pursuant to our modification, adapted simultaneously to provide electrical impulses through arm 90 of micro-switch S–20 riding in notches 92 of the cam. These electrical impulses are used to operate solenoid 40 as will be explained in greater detail later, thereby sequentially controlling the movable switch elements 38 through actuation of the pawl and spring means. Thus through an instant rotation of cam 82, temperature control is achieved through use of side 86 of cam 82 and at the same time a sequence of the desired operation is performed through the use of side 88. In case it is desired to advance solenoid 40 manually without the use of the temperature control device and micro-switch S–20, push-button 100 is provided, and when actuated provides the same electrical impulses as micro-switch S–20.

The circuitry shown in FIGS. 5 and 5a can better be explained by way of example which will be related, for purposes of illustration, to the several steps of an automatic dye process. Initially, switch S–10 is closed, supplying power to the circuit through lines T–1 and T–N. Now assume control means 80 has advanced to a point where arm 90 of switch S–20 engages a notch 92 in portion 88 of the cam 82. This closes a circuit which begins at T–N extends through relay R–10 and switch S–20 and back to T–1. Upon the closing of this circuit, sequence counter 5 is actuated giving a reading of the sequence number of the particular function. Also relay R–10 is actuated closing switch S–30 which energizes the DC circuit. Direct current will now flow from the DC power source through lines L–3 and L–4 to solenoid 40. This current flows through L–3 and L–4, through solenoid 40 and charges storage capacitor C–1 thus generating a pulse signal which actuates solenoid 40. R–1 is connected in parallel with storage capacitor C–1 in order that it may bleed the charge on capacitor C–1 to zero when the direct current supply is cut off. As discussed above, the actuation of solenoid 40 causes the electrical switches on platen 18 to advance to the next row of switch receptacles 30 which we will assume to be at row "3" on top piece 18. (See FIG. 6.) It will be noted that the only function desired to be performed at this stage is function number 2 which is the addition of cold water evidenced by plug 34a being in the respective receptacle. In the meantime, S–20 has become opened through arm 90 riding out of notch 92 of cam 82 thereby de-energizing relay R–10 which causes switch S–30 to return to its normal open position, which in turn opens the DC circuit through lines L–3 and L–4 thus preventing further actuation of solenoid 40. When plug 34a is contacted by its corresponding switch 38a (FIG. 5) due to the advancement of platen 36 a circuit is closed in the following manner:

The power source is connected, by lines L–1 and L–2, through switch S–10 to primary winding 6 of transformer 5 by terminals a and d. Transformer 5 has a single secondary winding 7 with terminals b and c. Terminal b is connected by line L–12 through a closed switch made when brush 38 contacts plug 34a to a terminal of the energizing winding of relay R–2 through lines L–5. The other terminal of the energizing winding is connected to terminal c of secondary winding 7 by line L–6 and terminal e. The completion of the circuit lights lamp 102 which is connected in series with switch S-2 and also energizes the desired function, which is in this case function No. 2, the addition of cold water to the system. This may be done in any conventional manner such as by tripping a valve through the actuation of a solenoid or the like. It may be noted that all the functions of the dye process as listed in FIG. 6 are performed in substantially the same manner as the one just described with the exception of the "pump" and "hold-sample" functions, which will be discussed in detail below.

While the foregoing has been taking place, cam 82 of control means 80 has been rotating as a function of time with one-half of the cam controlling a parameter such as temperature, as discussed earlier. Assume that after the cold water has been added to the system, the arm 90 of micro-switch S-20 engages another notch in the other half 88 of the cam. This will close the same circuit, actuate the relay R-10, and energize the DC circuit as discussed above. The solenoid 40 in turn will be actuated causing the electrical switches 38 to break contact with plug 34 in row 3 thus terminating the cold water function and to advance to the next row 4 of plug receptacles. Solenoid 40 is then de-actuated in the same manner as discussed above thus preventing for the time being further advancement of the electrical brushes 38. As seen in FIG. 6, only one plug 34b is resting in row 4, being located under function number 8, "pump timer number 1." A switch 38b contacts plug 34b causing a circuit to close through line L-10 thus actuating relay R-8 which closes switch S-8, in the same manner as described above. At this point, however, there is a deviation from the normal procedure discussed in relation to the last function. Upon closing of the switch S-8 current flows through line L-11 (continued in FIG. 5a), through relay R-20 and to power line T-N thereby completing the circuit. Actuation of relay R-20 closes switches S-22 and S-23 which are normally open and opens switch S-21 which is normally closed. The opening of switch 21 deactuates switch S-40 which is actuated only in the operation of timer #2, described below. The closing of switch 22 which extends from line T-1 closes a circuit through line L-22 and T-N thereby actuating timer #1. The closing of switch S-23 completes a circuit through lines T-1 and L-23 lighting lamp 120 and energizing the desired function which in this case is actuation of the pump which is done in any conventional manner as discussed above.

The pump required in this particular operation should be equipped with a standard four-way valve which is old in the art and not shown in these drawings. It is desirable that the valve be actuated at predetermined intervals in order to reverse the flow to and from said pump, which is essential in a dyeing process. This is done in the following manner: Timer #1, when actuated, is designed to cause switch S-50 to move from terminal f to terminal g and back again at predetermined intervals. A timer of this nature is old in the art and will not be described in detail. Switch S-50 is actuated during the entire operation of timer #1 since it is in a circuit from L-32 to switch 25 which is normally closed and opened only when timer #2, rather than timer #1, is in operation. When timer #1 causes switch S-50 to move to terminal f a circuit through line L-30 is completed which actuates the "inside-out" valve in the customary manner to provide for flow of the liquid dye in a particular direction and also causes lamp 130 to light. When the predetermined time is up, switch S-50 will then be moved to terminal g completing a circuit through line L-31 which actuates the "outside-in" valve to cause a reversal of the flow to and from the pump. In order that the predetermined intervals may vary without having to stop the complete system to make the necessary adjustments, other timers may be provided for with different intervals between reversal of flow. Timer #2 is shown which works in the same manner as timer #1, switch S-40 being actuated through the normally closed switch S-21. As mentioned above, temperature is also being controlled simultaneously with the above operation due to the movement of cam 82 of control means 80. It is therefore possible using the present invention to automatically sequence the use of a pump in the dyeing process and automatically control the flow of dye in and out of the pump at predetermined varying intervals while the pump is in operation.

Automatic means are provided to stop the system completely in order that a sample may be taken or the apparatus checked, etc. This means may be in the form of a control sequence similar to any other desired function and operates in the following manner: when a plug 34 is placed under function No. 12 called "hold-sample" a circuit is completed through line L-40 (FIGS. 5 and 5a) by a switch 38 contacting a plug 34 utilizing relay R-12 and switch S-12 in the usual manner. Referring in particular to FIG. 5a, line L-40 completes a circuit from L-41 at relay R-40 actuating the relay and opening switch S-60 which is normally closed. This breaks a circuit from line L-42 and line L-43 through relay R-50 thus de-energizing it and opening switches S-61 and S-62 which are normally closed. This in turn breaks a circuit from L-44 and L-45 to the control drive, thereby causing control means 80 to stop. This stops the entire process thus permitting the desired samples and checks to be made. When it is desired to begin operations, push-button 95 is manually actuated completing a circuit from lines L-46 and L-48 through relay L-50, thus energizing it, causing switches S-61 and S-62 to close and the control drive to start control means 80 which begins the automatic process. A bell is connected as shown in FIG. 5 to provide an alarm output.

Means are provided to manually control the entire operation if desired. Referring now to FIG. 5, the operator actuates the double pole switch 150 connecting line L-52 with line L-53 which closes a circuit from line L-52 through relay R-30 to line T-N and through line L-53 to line T-1. The closing of the above circuit lights lamp 160 and actuates relay R-30 which opens switch S-70, which is normally closed, thereby disengaging the ability to either manually or automatically actuate solenoid 40. Also the actuation of double pole switch 150 connects line L-50 with line L-51, line L-50 extending through the movable switch housing means to line L-12 and thereon to terminal b of transformer 5. Then any one of switches S-60 to S-67 may be manually actuated which completes the circuit from L-51 extending through a relay to line L-6 and thereon to terminal c of transformer b.

All lamps are physically arranged on a control panel board along with control means 80, the sequence counter, the pump timers, and the manually controlled switches to give a clear indication of which activity is in process so that the operator is kept completely informed as to all phases of the operation at all times.

It is therefore possible through the use of this invention to sequentially control various functions of a particular operation automatically whereby said functions may be set to occur at predetermined varying intervals, all occurring as a function of a basic parameter such as temperature. Also this invention provides for varying the flow of liquid to and from a pump which is a function in this particular process of automatic dyeing, said variations of flow being at predetermined intervals which intervals might also be varied automatically. Another feature of this invention as discussed above is a provision to stop the process automatically at a predetermined time rather than manually thus permitting various checks to be made before the process is started up again. Furthermore it is possible such as in case of breakdown to manually operate this apparatus which will then perform the desired functions.

What is claimed is:
1. Apparatus for controlling a plurality of circuits comprising a cam having a contoured periphery, means to move said cam through a path, two followers for said cam each following said periphery 180° apart, a temperature control device, a control mechanism, means responsive to displacement of one of said followers to actuate said control mechanism, and means responsive to displacement of the other of said followers to control said temperature control device.

2. A batch temperature-function program controller comprising a cam having a contoured periphery, means to move said cam through a path, two followers for said cam each following said periphery 180° apart, a function control mechanism, means responsive to displacement of one of said followers to actuate said function control mechanism, a batch temperature control device, and means responsive to displacement of the other of said followers to actuate said batch temperature control device.

3. The apparatus of claim 2, wherein said temperature control device is adapted to control the rate of temperature change in accordance with the particular function controlled.

4. The apparatus of claim 2, further comprising heating and cooling means for said batch, said temperature control device adapted to supply modulation signals to said heating and cooling means in accordance with the deviation in actual batch temperature from desired batch temperature.

References Cited

UNITED STATES PATENTS

| 2,347,344 | 4/1944 | Waidelich | 236—46 |
| 2,750,777 | 6/1956 | Buss | 68—12 |
| 3,083,273 | 3/1963 | D'Hooge. | |
| 3,101,435 | 8/1963 | Welch. | |
| 3,239,721 | 3/1966 | Wales | 317—123 |
| 3,315,499 | 4/1967 | Westall | 68—12 |

ORIS L. RADER, *Primary Examiner.*

T. J. MADDEN, *Assistant Examiner.*

UNITED STATES PATENT OFFICE
CERTIFICATE OF CORRECTION

Patent No. 3,358,161                      December 12, 1967

Jefferson L. Claiborne

It is hereby certified that error appears in the above numbered patent requiring correction and that the said Letters Patent should read as corrected below.

Column 3, line 64, for "ceives," read -- ceives. --; column 4, line 73, for "lines" read -- line --; column 6, line 29, for "L-50" read -- R-50 --.

Signed and sealed this 1st day of April 1969.

(SEAL)
Attest:

Edward M. Fletcher, Jr.                      EDWARD J. BRENNER
Attesting Officer                          Commissioner of Patents